United States Patent Office 3,582,459
Patented June 1, 1971

3,582,459
ETHYLENE-PROPYLENE POLYMER LAMINANT ADHERED BY A POLYBUTADIENE CARBOXY TERMINATED ADHESIVE AND A POLYFUNCTIONAL IMINE CURING AGENT
Jerry Tucker, Waco, Robert L. Hall, Midland, and Millard F. Thorp, Denton, Tex., assignors to North American Rockwell Corporation
No Drawing. Filed Mar. 7, 1968, Ser. No. 711,176
Int. Cl. G32b *15/08*
U.S. Cl. 161—217                 7 Claims

ABSTRACT OF THE DISCLOSURE

An article of manufacture having at least two surfaces wherein at least one of the surfaces comprises an ethylene-propylene polymer and wherein the surfaces are intimately joined at their interface by a cured adhesive composition comprising a functional group terminated polybutadiene wherein said functional group is a carboxyl, hydroxyl, amine, mercapto or isocyanate group cured with a polyfunctional imine which is nitrilotriethylbeta-propyleniminobutyrate or nitrilotriethyl-beta-ethyleneiminobutyrate. The adhesive composition may contain a reinforcing agent such as acetylene black or carbon black.

---

The present invention relates to a novel adhesive suitable for firmly bonding together like or unlike surfaces. More particularly, the invention pertains to a composition of matter comprising a modified telechelic-type polymer cured with a poly-functional imine to give workable tensile, bonding and aging properties. Specifically, this invention concerns a telechelic adhesive consisting essentially of a polybutadiene polymer possessing functional terminal reactive groups cured with a tri-functional alkylenimine.

The fabrication of many predetermined articles of commerce, military or science often requires the successful joining of both like or unlike surfaces. For example, synthetic rubbers, known to the art as elastomers, often are bonded to a different substrate in a given rocket for their case lining or heat insulating properties. However, serious limitations are frequently encountered in using the synthetic elastomers. One serious limitation of elastomers based on copolymers of ethylene and propylene, or terpolymers of ethylene, propylene and diene, and the like, is the difficulty in bonding these elastomers to themselves and to different, diverse substrates. Another limitation in the bonding art is the apparent present difficulty to successfully bond rocket propellant compositions containing poylmeric material to a given rocket case wall. The present invention provides a novel bonding composition of matter for essentially overcoming these and other like limitations. The inventive compositions described herein possess both bonding properties suitable for joining like or unlike surfaces and a shorter cure time to prevent an undesirable over-cure.

Accordingly, it is an object of the present invention to make available to the art a novel composition of matter that overcomes the limitations associated with the prior art.

Another object of the present invention is to provide an adhesive, composition comprising a telechelic type polymer cured by a poly-functional imine.

Yet another object of the present invention is to provide a composition of matter comprising a polybutadiene polymer possessing functional terminal groups cured with a tri-functional alkylidenimine.

A further object of the present invention is to provide a composition consisting of a base carboxyl terminated polybutadiene cross-linked with a nitrilotriethyl-beta-propylenimino butyrate.

A still further object of the present invention is to provide an adhesive having a cure time suitable for use in the manufacture of propellants and adhesive properties suitable for bonding elastomeric copolymers or terpolymers.

These and other objects of the invention will become more readily apparent from the following disclosure and the appended claims.

In attaining the objects and features of this invention, it has now been unexpectedly discovered that an improved adhesive possessing a shorter cure time and chemo-physical properties ideally suited for intimately and firmly joining like, or for joining unlike surfaces at their interface, can be made by formulating a composition containing a cross-linking of a functionally terminated polybutadiene with a poly-functional imine, acetylene black and other optionally chemical reagents.

Generally, the functionally terminated polybutadiene polymeric binders that can be employed within the mode and manner of the present invention are the telechelic polymers commercially available to the art, or they can easily be prepared by methods described in the prior art to which the instant subject matter pertains. An example of a telechelic-type polymer is carboxy-terminated linear polybutadiene. This type of polybutadiene polymer can be prepared by the method described in the Journal of Polymer Science, vol. XLVI, issue 149, pp. 535–539, (1960). The functional group terminated polybutadiene employed herein is the polybutadiene polymer of the structural formula R—(CH$_2$—CH=CH—CH$_2$)$_n$—R wherein the terminal functional group R is a carboxyl, hydroxyl, amine, mercapto or isocyanate radical and wherein $n$ equals about 100 to 130. Exemplary of a carboxyl-terminated polybutadiene is the polymer available under the trade designation "Butarez® CTL" manufactured by the Phillips Petroleum Company. The average molecular weight for this latter polymer is about 6000 to 7000, where $n$ equals about 110 to 130, it has an acid number in the range of about 16 to 17, and it contains an average of about 2 carboxyl groups per molecule. While the above listed telechelic polymer has been described in detail, it is to be understood that other functionally equivalent telechelic polymers obvious to those skilled in the present art could be successfully utilized.

The curative employed herein for curing the reactive group terminated linear polybutadiene polymers, as discussed supra, are of the tri-functional imine type. More specifically, the imines suitable for the present purpose are the commercially available imines broadly described as nitrilo-trilower alkyl lower alkylenimines, and these imines are exemplified by nitrilotriethyl-beta-ethyleniminobutyrate and nitrilotriethyl-beta-propyleniminobutyrate. The imine nitrilotriethyl-beta-propyleniminobutyrate has an improved formula of C$_{17}$H$_{48}$O$_3$N$_4$ and structural formula of

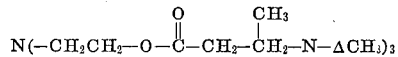

and the imine nitrilotriethyl-beta-ethyleniminobutyrate has an empirical formula of C$_{24}$H$_{42}$O$_6$N$_4$ and a structural formula of

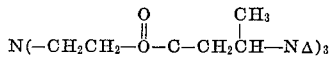

Generally, the amount of imine curing agent used in respect to the carboxy terminated polymer will be an imine to carboxy equivalent ratio of 1 to 1.00–1.10 or the like. Usually, about 80 to 90 weight percent of polymer is used to about 5 to 10 weight percent of the imine curing agent. Generally, the above listed polymer can be cured with the instant curing agent from 1 to 12 hours at a temperature of from about 170 to 190° F.

Typical reinforcing agents included within the novel adhesives are acetylene black of the 50 percent compressed and 100 percent compressed type, carbon black and the like. The reinforcing agent is usually used in an amount in the range of about 5 weight percent to about 10 weight percent.

The components of the composition of this invention are thoroughly mixed together in a suitable mixer, such as a Baker-Perkins mixer, to form the master batch. The polymeric materials, without the curative are first mixed, then, the other ingredients of the adhesive composition such as acetylene black are completely incorporated into the milling polymeric mixture. This mixing procedure usually takes about 10 minutes to about 20 minutes. It is desirable to circulate cooling water through the jacket during the mixing cycle to maintain the temperature in the region of 75° F. to 80° F. Next, the curative is added to the mixture and the mixture continued for an additional 15 to 30 minutes to insure a homogeneous blend of the components of the adhesive composition. The final adhesive composition can be sheeted to a given desired dimension by spreading and curing it on a substrate such as glass or by impregnating it on a carrier cloth. For relatively thin films of a few mils thick on a substrate, the adhesvie may be dissolved in a suitable organic solvent such as methylchloroform, toluene, xylene, isooctane or the like and then solvent sprayed or troweled onto the given substrate.

The above ingredients and methods are merely illustrative of the spirit of the invention, and it is to be understood that they are not intended to limit the disclosure, as other techniques may be employed by those skilled in the art in the light of the present teachings. The following examples are illustrative of the invention and they are not to be considered as limiting the scope of the invention.

EXAMPLE I

A novel adhesive composition of matter was prepared as follows: 85.25 grams of a carboxy-terminated polybutadiene, commercially available under the registered trademark Butarez® CTL, Phillips Petroleum Company, was milled in a Baker-Perkins mixer for about 15 minutes at a temperature of 77° F. and then 8.53 grams of acetylene black, 100 percent compressed was added to the milling polymer and the milling continued for about 10 minutes to completely incorporate the acetylene black into the polymer. Then, 6.22 grams of the curing agent nitrilo-triethyl-beta-propylenimino butyrate, commercially available from the American Cyanamid Company, was added to the mixture and the mixing continued at the above temperature under normal atmospheric conditions for approximately 20 minutes, followed by 5 minutes mixing under a light vacuum to remove any entrapped air from the composition.

The amount of imine curing agent to carboxy equivalent of the polybutadiene polymer was 1.05. The imine to carboxy equivalent ratio of 1.05 was calculated on 89 percent of the theoretical reactive imine determined by assay for the nitrilo triethyl-beta-propylenimino butyrate and 1.6 grams carboxy per 100 grams of the polybutadiene polymer. The adhesive exhibited an elongation of 375 percent, a tensile strength of 265 and a Shore A hardness of 31 after 2 hours cure at 190° F. The tests were made at 77° F. The adhesive exhibited a density of 0.0364 lb./cubic inch.

EXAMPLE II

A composition consisting of 85.47 weight percent carboxy terminated polybutadiene, 5.98 weight percent of nitrilotriethyl-beta-propyleniminobutyrate, American Cyanamid Company, and 8.55 acetylene black was prepared according to the procedure set forth in Example I. The composition had an imine to carboxy equivalence ratio of 1.01, an elongation of 345, a tensile strength of 240 and a Shore A hardness of 25.

EXAMPLE III

The adhesive force or bond strength in tension, shear and peel properties for the adhesive composition prepared in Example I supra was measured with three different substrates, steel, a propellant, and an elastomeric composition. These tests were conducted as follows: two pieces of steel 4 x 1 x ⅛ inches were first primed with a commercial elastomeric primer known as Chemlok® EX–B500–1, Hughson Chemical Company, and a thin piece, about 70–80 mils thick, of the composition of Example I, was fixed to the primed steel. Next, the composition was cured for three hours at 190° F. for the development of the adhesive forces. The adhesive forces of the adhesive strip were measured using an Instron Universal tensile strength machine and the sample exhibited a bonding tension of 250 p.s.i., a peel forces of 3.0 p.l.i. (pounds per linear inch) and a shear of 150 p.s.i.

The adhesive force for the composition when bonded to a piece of elastomer consisting of 75.47 weight percent of ethylene-propylene terpolymer, Nordel®, available from E. I. du Pont, 22.64 weight percent carbon black and 1.89 weight percent 2,5-dimethyl-2,5-di(t-butylperoxy)hexane, 50 percent active peroxide, was after curing the adhesive for three hours at 190° F. as follows: bonding tension 265 p.s.i., peel 12 p.l.i. and shear 175 p.s.i.

The adhesive composition was used to bond a propellant formulation containing ammonium perchlorate, metallic aluminum, telechelic carboxy polybutadiene polymeric binder and curative to steel poker chips according to the following procedure: A thin, uncured coating of about 2 mils thick of the adhesive composition was spread onto circular steel chips about 1½ inches in diameter to bond the adhesive to the chips. Then, an uncured sample of the above described propellant formulation was placed in intimate contact with the adhesive layer and the propellant formulation was cured at 170° F. for 96 hours. The composite steel-adhesive-propellant article of manufacture demonstrated an adhesive bond tension of about 121 p.s.i.

The novel adhesive compositions of this invention can be employed for intimately bonding like materials to each other and to other materials. For example, the adhesives can be used to firmly join ethylene-propylene elastomers to themselves or to bond it to a steel surface in a rocket; the adhesive can also be used to bond solid propellant formulations to rocket case walls. The adhesive can also be used for the interface bonding of rubber, plastic films, plastic tiles, metals and the like to similar or dissimilar surfaces in industries where adhesives are employed, such as building, automotive, etc.

Although the invention has been described and illustrated in detail, it is to be clearly understood that the same is by way of illustration and example only, and it is not to be taken by way of limitation as other embodiments will be apparent from reading of this invention.

We claim:

1. An article of manufacture having at least two surfaces wherein at least one of said surfaces comprises an ethylene-propylene polymer and wherein said surfaces are intimately joined at their interface by a cured adhesive composition comprising a functional group terminated polybutadiene wherein said functional group is selected from the group consisting of a carboxyl, hydroxyl, amine, mercapto and isocyanate group cured with a polyfunctional imine selected from the group consisting of nitrilotriethyl-beta-propyleniminobutyrate and nitrilotriethyl-beta-ethyleniminobutyrate.

2. The article of manufacture of claim 1 in which the ethylene-propylene polymer is an ethylene-propylene diene terpolymer.

3. The article of manufacture of claim 1 in which the functional group terminated polybutadiene comprises about 80 to 90 weight percent of the adhesive composition and the polyfunctional imine comprises about 5 to 10 weight percent of said adhesive composition.

4. The article of manufacture of claim 3 in which the adhesive composition contains about 5 to 10 weight percent of a reinforcing agent selected from the group consisting of acetylene black and carbon black.

5. The article of manufacture of claim 1 in which the functional group of the functional group terminated polybutadiene is a carboxyl group.

6. The article of manufacture of claim 1 in which one of the surfaces is a steel surface.

7. The article of manufacture of claim 6 in which the steel surface is a surface of a rocket case wall.

References Cited
UNITED STATES PATENTS

| | | | |
|---|---|---|---|
| 3,153,639 | 10/1964 | Kraus | 260—94.7N |
| 3,242,129 | 3/1966 | Wilder | 260—41.5 |
| 3,436,387 | 4/1969 | Hoffman | 260—94.7N |
| 3,445,318 | 5/1969 | Brams et al. | 161—217 |
| 3,502,542 | 3/1970 | Wenisch | 161—216 |

MORRIS LIEBMAN, Primary Examiner

T. MORRIS, Assistant Examiner

U.S. Cl. X.R.

260—41.5